(12) United States Patent
Vukovic et al.

(10) Patent No.: US 8,244,265 B2
(45) Date of Patent: Aug. 14, 2012

(54) TECHNIQUES FOR ALIGNING APPLICATION OUTPUT AND UPLINK RESOURCE ALLOCATION IN WIRELESS COMMUNICATION SYSTEMS

(75) Inventors: Ivan N. Vukovic, Arlington Heights, IL (US); Rangsan Leelahakriengkrai, Streamwood, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1260 days.

(21) Appl. No.: 11/946,208

(22) Filed: Nov. 28, 2007

(65) Prior Publication Data

US 2009/0137254 A1    May 28, 2009

(51) Int. Cl.
   *H04W 72/00* (2009.01)
(52) U.S. Cl. .......... 455/452.1; 455/450; 455/67.13; 455/452.2; 370/330; 370/329; 370/342; 370/441; 370/252
(58) Field of Classification Search .......... 370/329, 370/346, 229, 445, 320, 235, 463, 347, 350, 370/509, 324, 330, 252, 337; 455/554.2, 455/450, 438, 502, 452.2
   See application file for complete search history.

(56) References Cited

U.S. PATENT DOCUMENTS

| | | | | |
|---|---|---|---|---|
| 3,372,043 | A * | 3/1968 | Fanselow | 501/150 |
| 7,181,223 | B1 | 2/2007 | Pecen et al. | |
| 7,574,224 | B2 * | 8/2009 | Lane et al. | 455/502 |
| 2006/0087974 | A1 * | 4/2006 | Ozer et al. | 370/235 |
| 2006/0245352 | A1 | 11/2006 | Kang et al. | |
| 2007/0047566 | A1 * | 3/2007 | Hardie | 370/420 |
| 2007/0086370 | A1 | 4/2007 | Jang et al. | |
| 2007/0121498 | A1 * | 5/2007 | Park et al. | 370/229 |
| 2007/0159969 | A1 * | 7/2007 | Das et al. | 370/229 |
| 2007/0189239 | A1 * | 8/2007 | Lim et al. | 370/337 |
| 2007/0206561 | A1 * | 9/2007 | Son et al. | 370/346 |
| 2008/0070578 | A1 * | 3/2008 | Flore et al. | 455/438 |
| 2008/0207214 | A1 * | 8/2008 | Han et al. | 455/450 |
| 2008/0253325 | A1 * | 10/2008 | Park et al. | 370/329 |

FOREIGN PATENT DOCUMENTS

WO    2005096532 A1    10/2005

OTHER PUBLICATIONS

Lee, Howon et al.: "Performance Analysis of Scheduling Algorithms for VoIP Services in IEEE 802.16e Systems", In: Vehicular Technology Conference, 2006. IEEE 63rd, Melbourne, May 7-10, 2006, vol. 3, pp. 1231-1235.

Wang, Qiang et al.: "A Probing Process for Dynamic Resource Allocation in Fixed Broadband Wireless Access Networks", In: Vehicular Technology, IEEE Transactions on Jul. 2003, vol. 52, No. 4, pp. 1143-1157.

* cited by examiner

*Primary Examiner* — Rafael Pérez-Gutiérrez
*Assistant Examiner* — Joseph Arévalo

(57) ABSTRACT

A technique for reducing a time delay between an application output at a subscriber station and uplink resource allocation for the subscriber station includes scheduling, between periodic uplink resource allocations, one or more probe uplink resource allocations for the subscriber station. Next, respective information in at least one of the one or more probe uplink resource allocations is received at an access point. Finally, subsequent periodic uplink resource allocations are scheduled based on at least one of the one or more probe uplink resource allocations.

17 Claims, 9 Drawing Sheets

TECHNIQUES FOR ALIGNING APPLICATION OUTPUT AND UPLINK RESOURCE ALLOCATION IN WIRELESS COMMUNICATION SYSTEMS

BACKGROUND

1. Field

This disclosure relates generally to wireless communication systems and, more specifically, to techniques for aligning application output and uplink resource allocation in wireless communication systems

2. Related Art

Today, many wireless communication systems are designed using a shared uplink (UL) channel. For example, in the Institute of Electrical and Electronics Engineers (IEEE) 802.16 (commonly known as worldwide interoperability for microwave access (WiMAX)) and third-generation partnership project long-term evolution (3GPP-LTE) compliant architectures, a UL channel is shared and resources are periodically allocated to individual flows in the case of delay sensitive (e.g., real-time) applications (e.g., voice over Internet protocol (VoIP) applications, gaming applications, etc.). As a serving base station (BS) usually has less than ideal information on application packet arrival at a medium access control (MAC) layer of a subscriber station (SS), packets that are transmitted by the SS may experience undesirable additional delay. For example, real-time flows in wireless communication systems that are compliant with IEEE 802.16e may experience undesirable time delays that correspond to a time difference between when a packet enters and exits (i.e., is transmitted on a UL assigned to the SS) a queue in a MAC layer of the SS. While SSs in IEEE 802.16 compliant wireless communication systems have the ability to report a queuing delay to a serving BS (e.g., in a frame latency field of a MAC layer management message), the reported queuing delay has not generally allowed the serving BS to adequately reduce the queuing delay.

In IEEE 802.16 compliant wireless communication systems, a quality of service (QoS) parameter set is defined for each service flow, which is a unidirectional flow of packets between an SS and a serving BS and vice versa. Each service flow has an assigned service flow identification (SFID), which functions as a principal identifier for the service flow between an SS and a serving BS. In IEEE 802.16 compliant wireless communication systems, scheduling services represent the data handling mechanisms supported by a MAC scheduler for data transport on a connection. Each connection is associated with a single scheduling service, which is determined by a set of QoS parameters that are managed using dynamic service addition (DSA) and dynamic service change (DSC) message dialogs. IEEE 802.16e compliant wireless communication systems support a number of different data services. For example, IEEE 802.16e compliant wireless communication systems are designed to support unsolicited grant service (UGS), real-time polling service (rtPS), extended real-time polling service (ertPS), non-real-time polling service (nrtPS), and best effort (BE) service.

UGS is designed to support real-time uplink service flows that transport fixed-sized packets on a periodic basis, such as T1/E1 and voice over Internet protocol (VoIP) without silence suppression. In general, UGS offers fixed-sized grants on a real-time periodic basis, which generally eliminates overhead and latency associated with SS requests and generally assures that grants are available to meet real-time requirements of a flow. The rtPS is designed to support real-time uplink service flows that transport variable size data packets on a periodic basis, e.g., moving picture expert group (MPEG) video. The rtPS offers real-time, periodic, unicast request opportunities that are designed to meet real-time requirements of a flow while allowing an SS to specify a desired grant size. The ertPS is a scheduling mechanism that builds on the efficiency of both UGS and rtPS. Similar to UGS, in ertPS a BS provides unicast grants in an unsolicited manner, which saves the latency associated with a bandwidth request. However, while UGS allocations are fixed in size, ertPS allocations are dynamically sized. The ertPS is designed to support real-time service flows that generate variable size packets on a periodic basis, such as VoIP services with silence suppression. The nrtPS offers unicast polls on a regular basis, which generally assures that an uplink service flow receives request opportunities, even during network congestion. Finally, the BE grant scheduling type is designed to provide efficient service for best effort traffic in an uplink.

What is needed are techniques for aligning application output of a subscriber station and uplink resource allocation for the subscriber station that generally improve a quality of service of an associated real-time service flow in a wireless communication system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
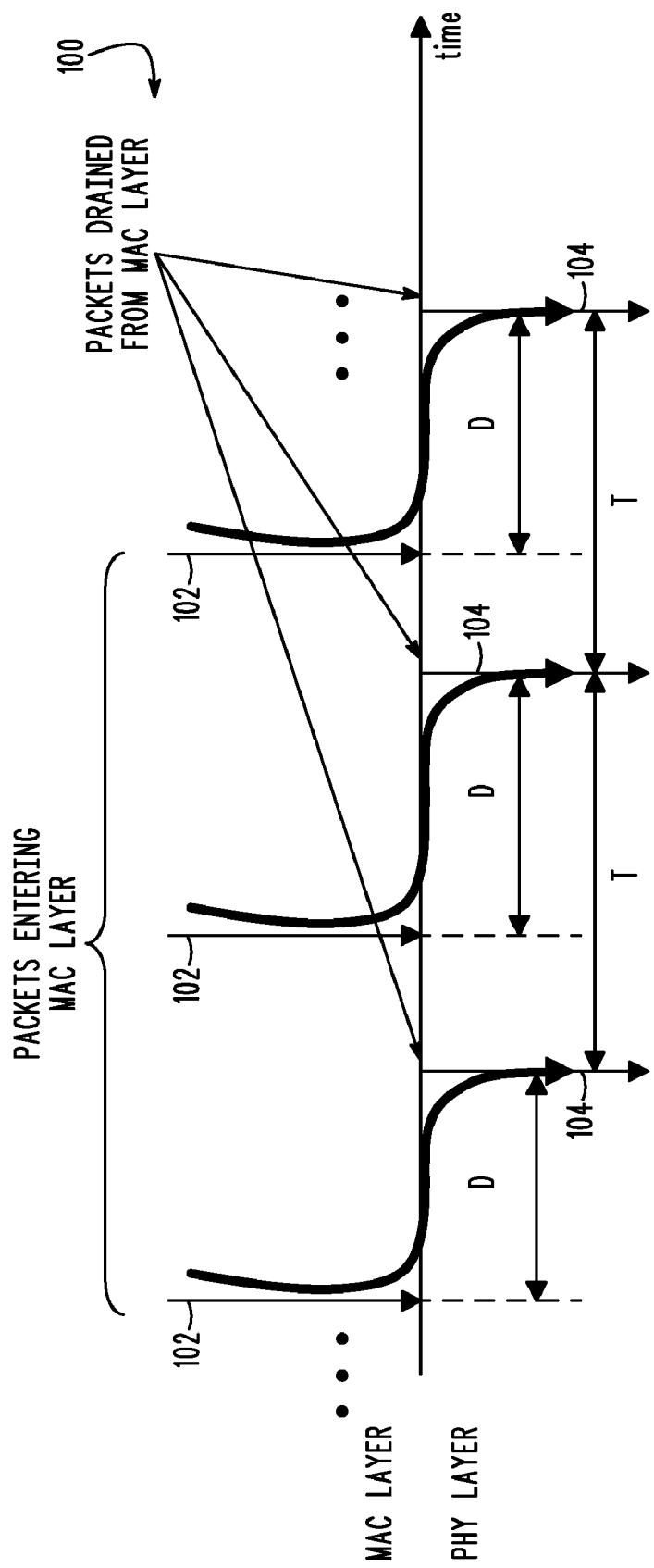
FIG. 1 is a conventional service flow diagram that illustrates a typical time delay associated with a packet entering and exiting a queue of a medium access control (MAC) layer of a conventional subscriber station (SS).

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents.

While the discussion herein is generally directed to a WiMAX compliant wireless communication system, it should be appreciated that the techniques disclosed herein are broadly applicable to wireless communication systems that employ real-time quality of service (QoS) classes that utilize periodic uplink resource allocations. As used herein, the term "coupled" includes both a direct electrical connection between blocks or components and an indirect electrical connection between blocks or components achieved using intervening blocks or components.

According to one aspect of the present disclosure, a technique for reducing a time delay between an application output (e.g., of a medium access control (MAC) layer) at a subscriber station (SS) and uplink resource allocation for the SS includes scheduling, between periodic uplink resource allocations, one or more probe uplink resource allocations for the SS. Next, respective information in at least one of the one or more probe uplink resource allocations is received at an access point. Finally, subsequent periodic uplink resource allocations are scheduled based on at least one of the one or more probe uplink resource allocations.

According to another aspect of the present disclosure, a technique for reducing a time delay between an application output at a subscriber station (SS) and an uplink resource allocation for the SS includes determining, at the SS, a substantially optimum time for subsequent periodic uplink resource allocations based on respective queue sizes of a queue of the SS at different times. A request, to provide the subsequent periodic uplink resource allocations at the substantially optimum time, is then transmitted to an access point, e.g., a serving base station.

According to a different aspect of the present disclosure, a wireless communication system includes a subscriber station (SS) and a base station (BS) in communication with the SS. The BS is configured to schedule, between periodic uplink resource allocations, one or more probe uplink resource allocations for the SS. The BS is also configured to receive respective information in at least one of the one or more probe uplink resource allocations. Finally, the BS is configured to schedule subsequent periodic uplink resource allocations based on at least one of the one or more probe uplink resource allocations.

With reference to FIG. 1, a conventional service flow diagram 100 illustrates an exemplary time delay 'D' associated with a packet entering 102 and exiting (at periodic uplink resource allocations 104) a queue of a medium access control (MAC) layer of a subscriber station (SS). The diagram 100 is equally applicable to both UGS and ertPS quality of service (QoS) classes. As briefly mentioned above, UGS is a MAC service class that allocates resources periodically (in this case every time period 'T') to an SS, e.g., a mobile station (MS). As noted above, ertPS primarily differs from UGS in that ertPS allows allocations to be changed and may go to zero during Voice over Internet Protocol (VoIP) silence periods. In a typical case, a time delay 'D', which corresponds to the time between when a packet enters 102 and exits the MAC layer of an SS, usually ranges between one frame (including, for example, one uplink subframe having multiple symbols and one downlink subframe having multiple symbols) and the time period 'T'. It should, however, be appreciated that the time delay 'D' may be larger than the time period 'T' when a queuing component is included within the time delay 'D'. In the case illustrated in FIG. 1, the time delay 'D' may be uniform with, for example, an average of T/2. As one example, in the case of VoIP service, the time period 'T' may be equal to 20 milliseconds. In this case, the time delay 'D' is equal to 10 milliseconds on the average.

Figure 2:
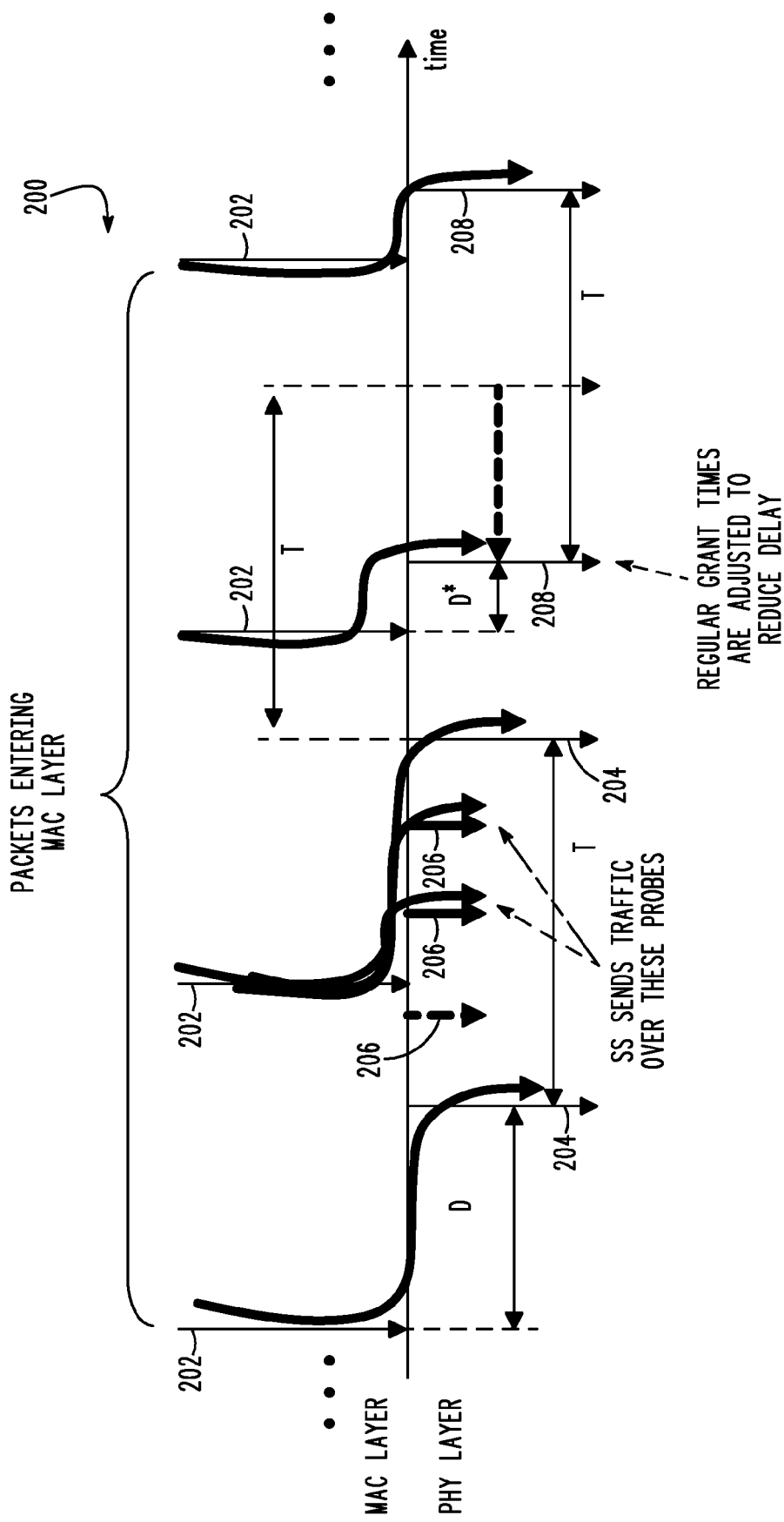
FIG. 2 is a service flow diagram that illustrates a time delay associated with a packet entering and exiting a queue of a MAC layer of an SS in a wireless communication system that employs one or more probe uplink resource allocations according to an embodiment of the present disclosure.

Referring now to FIG. 2, a service flow diagram 200 is provided that illustrates an exemplary time delay 'D' associated with a packet entering 202 and exiting (at periodic uplink resource allocations (grants) 204) a queue of a medium access control (MAC) layer of a subscriber station (SS). The diagram 200 is also applicable to both UGS and ertPS quality of service (QoS) classes, as well as any other real-time QoS class that utilizes periodic uplink resource allocations. In a typical case that employs techniques according to the present disclosure, the time delay 'D', which corresponds to a time between when a packet enters and exits the MAC layer of an SS, may be substantially reduced (e.g., to zero or to a single frame time period, such as 5 milliseconds for WiMAX and 1.0 milliseconds for 3GPP-LTE). In the embodiment illustrated in FIG. 2, a time delay 'D*' is achieved by introducing one or more probe uplink resource allocations (grants) 206, e.g., by introducing one of the probe uplink (UL) resource allocations 206 each frame. As is illustrated in FIG. 2, only second and third (in time) probe UL resource allocations of the one or more probe UL resource allocations 206 are utilized by the SS to transmit respective information, as a packet enters the MAC layer after a first (in time) probe UL resource allocation of the one or more probe UL resource allocations 206.

According to various aspects of the present disclosure, subsequent periodic UL resource allocations 208 are adjusted to correspond to the first probe UL resource allocation utilized by the SS (in this case, the second (in time) probe UL resource allocation of the one or more probe UL resource allocations 206 depicted in FIG. 2) to indicate an optimal UL grant time. According to this approach, an access point (AP), e.g., a serving base station (BS), allocates (grants) one or more probe UL resource allocations to the SS in between periodic UL resource allocations each burst (where each burst may include one or more frames). Each probe UL resource allocation may, for example, be sized the same as the periodic UL resource allocations or may have a different size. It should be appreciated that using smaller probe UL resource allocations (as compared to a size of the periodic UL resource allocations) lowers the bandwidth required for the probe UL resource allocations. For example, a periodic UL resource allocation may correspond to one thousand bytes and a probe UL resource allocation may correspond to one byte. In this embodiment, when the AP determines that one of the one or more probe UL resource allocations is utilized by the SS to transmit respective information for a desired service flow, the AP marks the time and shifts subsequent periodic UL resource allocations to the new time (modulo 'T'). It should be appreciated that an SS may be configured to utilize none, one, or more than one of the probe UL resource allocations. For example, all probe UL resource allocations (herein also referred to as 'probes') may be utilized by the SS. In this case, some of the probes may only include padding such that the transition between the padding and data for the desired service flow indicates data arrival in one of the probes (which corresponds to the optimal UL grant time). As another example, some probes may carry data for other service flows, as allocations are granted to an SS and not a particular service flow. In this case, different service flows may be detected by different connection identifications (CIDs) and probes having padding or belonging to a different service flow would not indicate data arrival for the desired service flow. At any rate, in this embodiment, the AP has afforded the SS the opportunity to transmit respective information at a more optimal time in terms of delay time.

Figure 3:
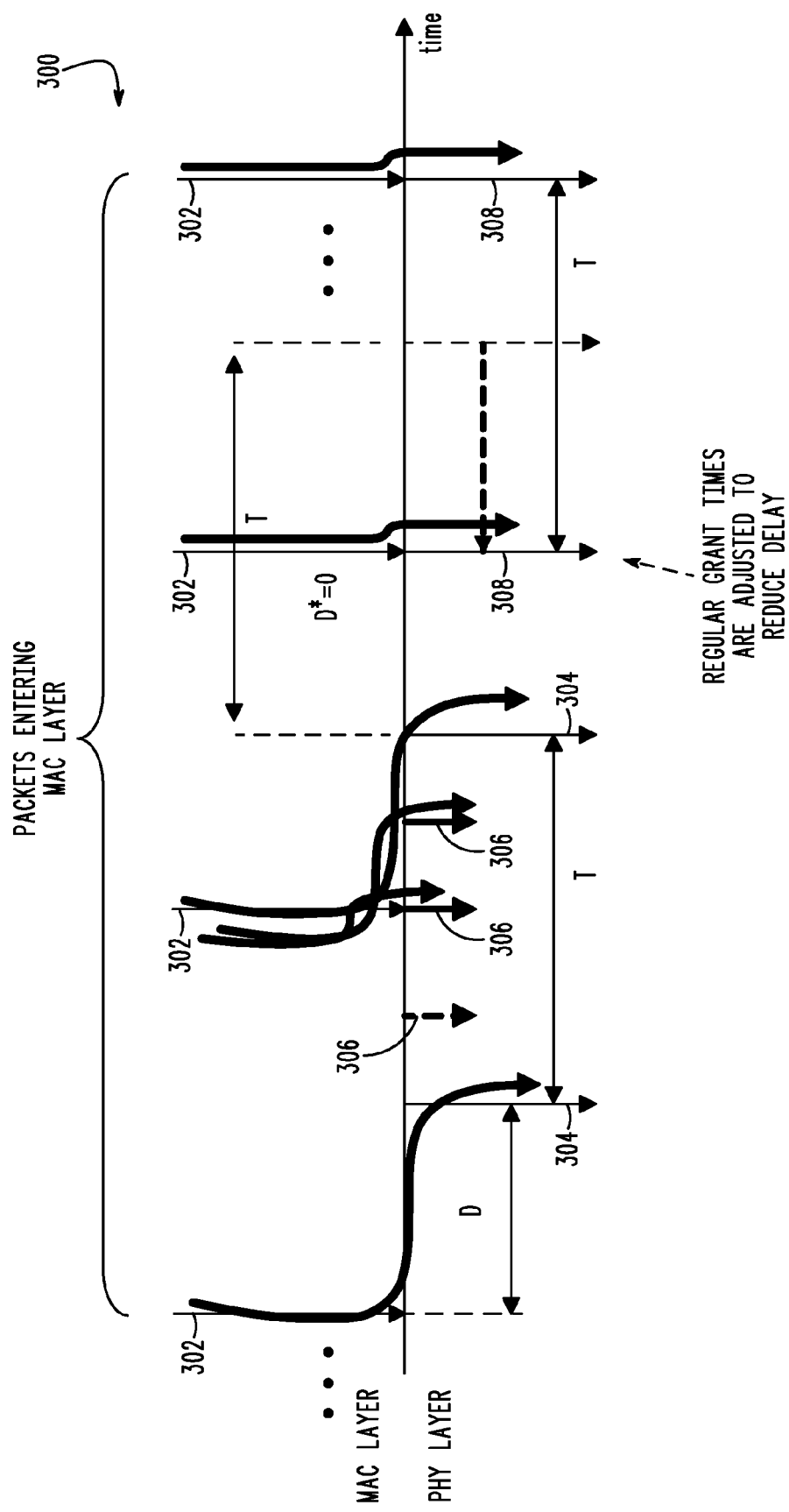
FIG. 3 is a service flow diagram that illustrates a time delay associated with a packet entering and exiting a queue of a MAC layer of an SS in a wireless communication system that employs one or more probe uplink resource allocations according to an embodiment of the present disclosure.

Referring now to FIG. 3, a service flow diagram 300 is provided that illustrates an exemplary delay time 'D' associated with a packet entering 302 and exiting (at periodic uplink resource allocations (grants) 304) a queue of a medium access control (MAC) layer of a subscriber station (SS). The diagram 300 is applicable to both UGS and ertPS quality of service (QoS) classes, as well as any other real-time QoS class that utilizes periodic uplink resource allocations. Following the technique of FIG. 2, one or more probe uplink resource allocations (grants) 306 are employed. In this case, the time delay 'D', which corresponds to a time between when a packet enters and exits the MAC layer of an SS, may be substantially reduced to zero as an entry 302 of a packet into the MAC layer of the SS coincides with a second (in time) probe uplink resource allocation of the one or more probe uplink resource allocations 306. In the embodiment illustrated in FIG. 3, a time delay 'D*' of zero is achieved by adjusting subsequent periodic uplink resource allocations 308 to correspond to the second (in time) probe uplink resource allocation of the one or more probe uplink resource allocations 306, i.e., the first probe uplink resource allocation utilized by the SS to transmit respective information for a desired service flow. In this embodiment, when the AP determines that the second (in time) one of the probe uplink resource allocations 306 has been utilized by the SS, the AP marks the time and shifts subsequent periodic UL allocations to the new time (modulo 'T').

Figure 4:
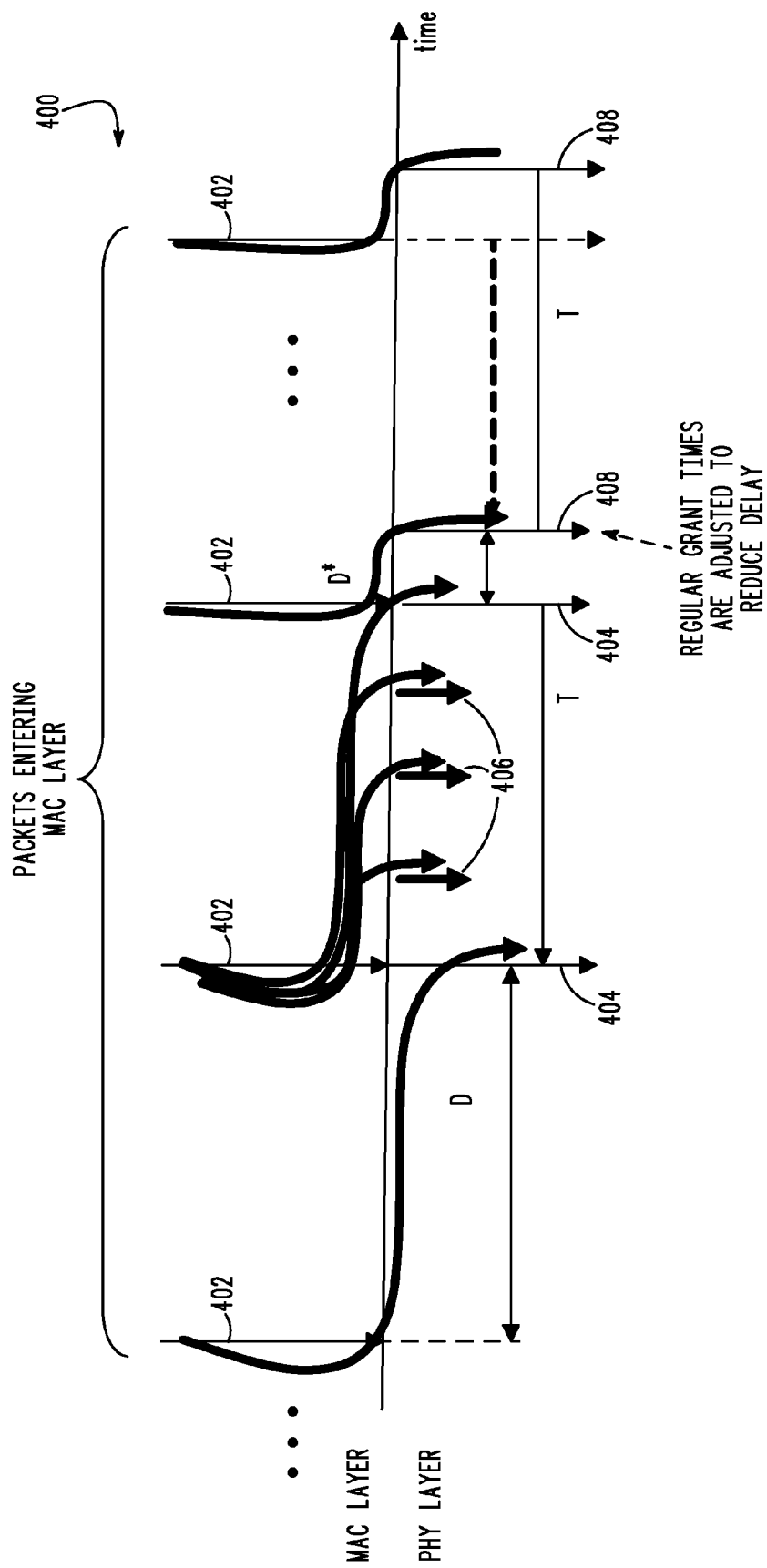
FIG. 4 is a service flow diagram that illustrates a time delay associated with a packet entering and exiting a queue of a MAC layer of an SS in a wireless communication system that employs one or more probe uplink resource allocations according to an embodiment of the present disclosure.

With reference now to FIG. 4, a service flow diagram 400 is provided that illustrates a typical time delay 'D' associated with a packet entering 402 and exiting (at periodic uplink resource allocations (grants) 404) a queue of a medium access control (MAC) layer of a subscriber station (SS). The diagram 400 is also applicable to both UGS and ertPS quality of service (QoS) classes, as well as any other real-time QoS class that utilizes periodic uplink resource allocations. Following the technique of FIG. 2, one or more probe uplink resource allocations (grants) 406 are employed. In this case, the time delay 'D', which corresponds to a time between when a packet enters 402 and exits the MAC layer of an SS, is initially equal to the time period 'T', e.g., 20 milliseconds. As is illustrated, packet entry into the MAC layer does not coincide with any of the probe uplink resource allocations (grants) 406. In the embodiment illustrated in FIG. 4, a time delay 'D*' of one frame time period (e.g., 5 milliseconds for a 5 millisecond WiMAX frame) is achieved by adjusting subsequent periodic uplink resource allocations 408 to correspond to the first (in time) probe uplink resource allocation of the one or more probe uplink resource allocations 406. In this embodiment, when the AP determines that the first probe has been utilized by the SS for a desired service flow, the AP marks the time and shifts subsequent regular allocations to the new time (modulo 'T'). It should be appreciated that two frame re-transmissions can be performed in a VoIP application, if needed, as an associated time delay (i.e., 45 milliseconds (20 milliseconds+20 milliseconds+5 milliseconds)) is still less than a typical VoIP time delay budget (e.g., 50 milliseconds).

Figure 5:
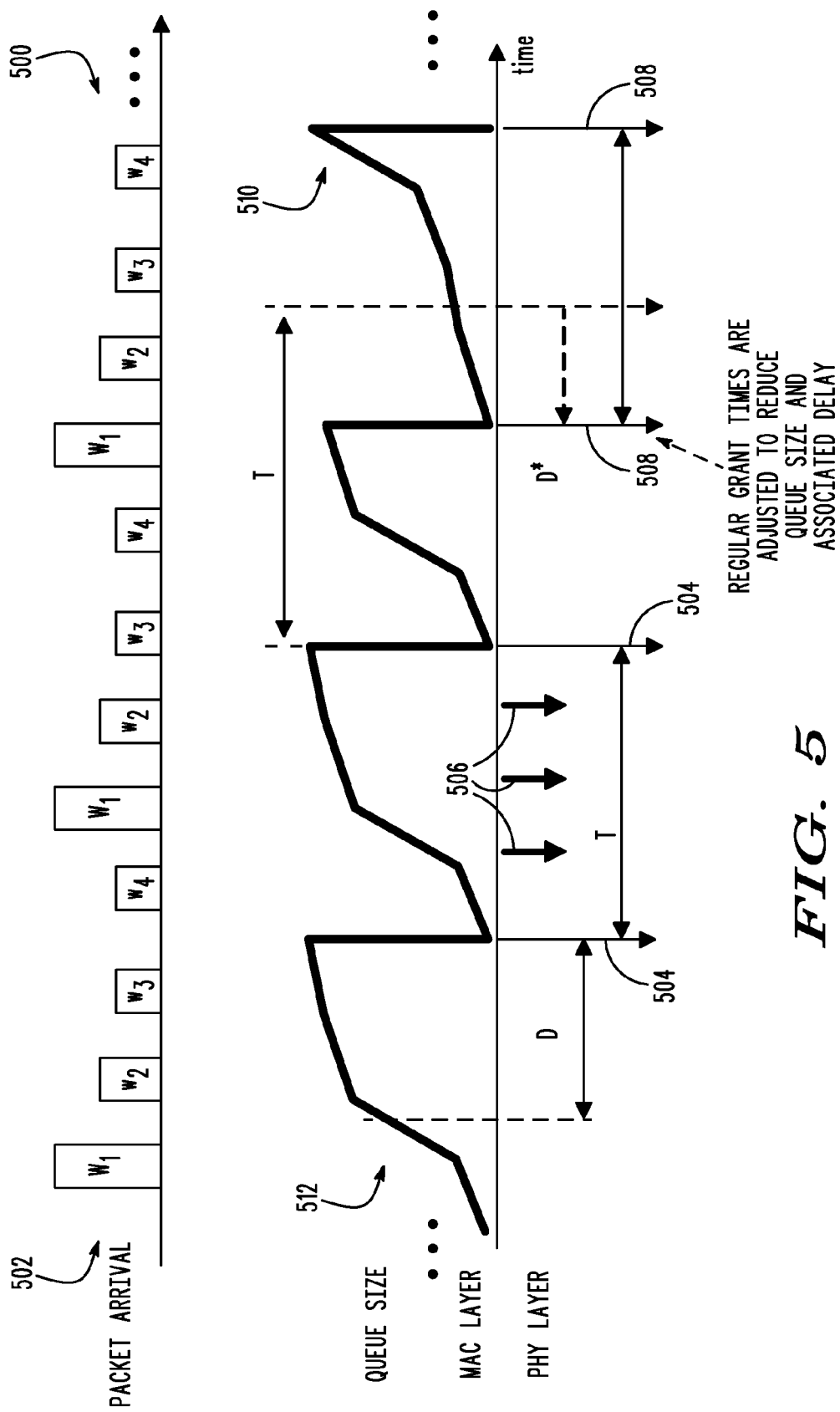
FIG. 5 is a diagram that illustrates a technique for reducing a queue size of a queue in a MAC layer of an SS in a wireless communication system according to another embodiment of the present disclosure.

Referring now to FIG. 5, a diagram 500 is provided that depicts an exemplary packet arrival stream (including periodic packets $W_1$, $W_2$, $W_3$, and $W_4$) 502 and a corresponding queue size 512 of a queue in a MAC layer of a subscriber station (SS) that receives the packet stream 502 from one or more sources. In the embodiment illustrated in FIG. 5, the periodic packets $W_1$, $W_2$, $W_3$, and $W_4$ are provided during each time period 'T'. It should be appreciated that the queue size 512 of the SS varies depending upon when periodic uplink resource allocations 504 are scheduled. The diagram 500 is applicable to both UGS and ertPS quality of service (QoS) classes, as well as any other real-time QoS class that utilizes periodic uplink resource allocations. Similar to the technique associated with FIG. 2, one or more probe uplink resource allocations (grants) 506 may be employed. However, unlike the technique of FIG. 2, the technique of FIG. 5 utilizes the probe uplink resource allocations 506 to report the queue size at given points in time to an access point (AP), e.g., a serving base station (BS).

According to one embodiment of the present disclosure, the AP determines an optimal periodic (regular) UL grant time based on the following minimization equation, that is, by minimizing the following quantity:

$$\text{Min}[jW_i + (j-1)W_{(i+1) \bmod j} + (j-2)W_{(i+2) \bmod j} + \ldots + W_{(i+j-1) \bmod j}] i=1, 2, \ldots j$$

where $W_i$ is the queue size at frame i and j is the number of arrivals during the time period 'T'. In the embodiment illustrated in FIG. 5, j is equal to four and a minimum queue size can be achieved by shifting a periodic UL grant time to prior to the arrival of the $W_2$ packet. As used herein, the term "optimal periodic UL grant time" is the periodic UL grant time that reduces the delay to a lowest given value under the circumstances. In embodiment illustrated in FIG. 5, when the AP determines the optimal time, the AP marks the time and shifts subsequent periodic (regular) UL resource allocations 508 to the new time (modulo 'T'), which results in a queue size following waveform 510. It should be appreciated that when only one packet arrives during the time period 'T', the optimal periodic UL grant time provided by the above minimization equation is the same as that determined using the approaches set forth above with respect to FIGS. 2-4.

According to another aspect of the present disclosure, the SS minimizes the above equation to determine an optimal periodic UL grant time. In this case, after determining the optimal periodic UL grant time, the SS requests that the AP shift the periodic UL grant times to the optimal periodic UL grant time. For example, the SS may request the shift of the periodic UL grant time by reporting a frame latency in a frame latency field in a MAC management message in a WiMAX compliant wireless communication system. Alternatively, the SS may request the shift of the periodic UL grant time in an additional UL grant provided by the AP or in a portion of a periodic UL grant that is provisioned to receive the request.

Figure 6:
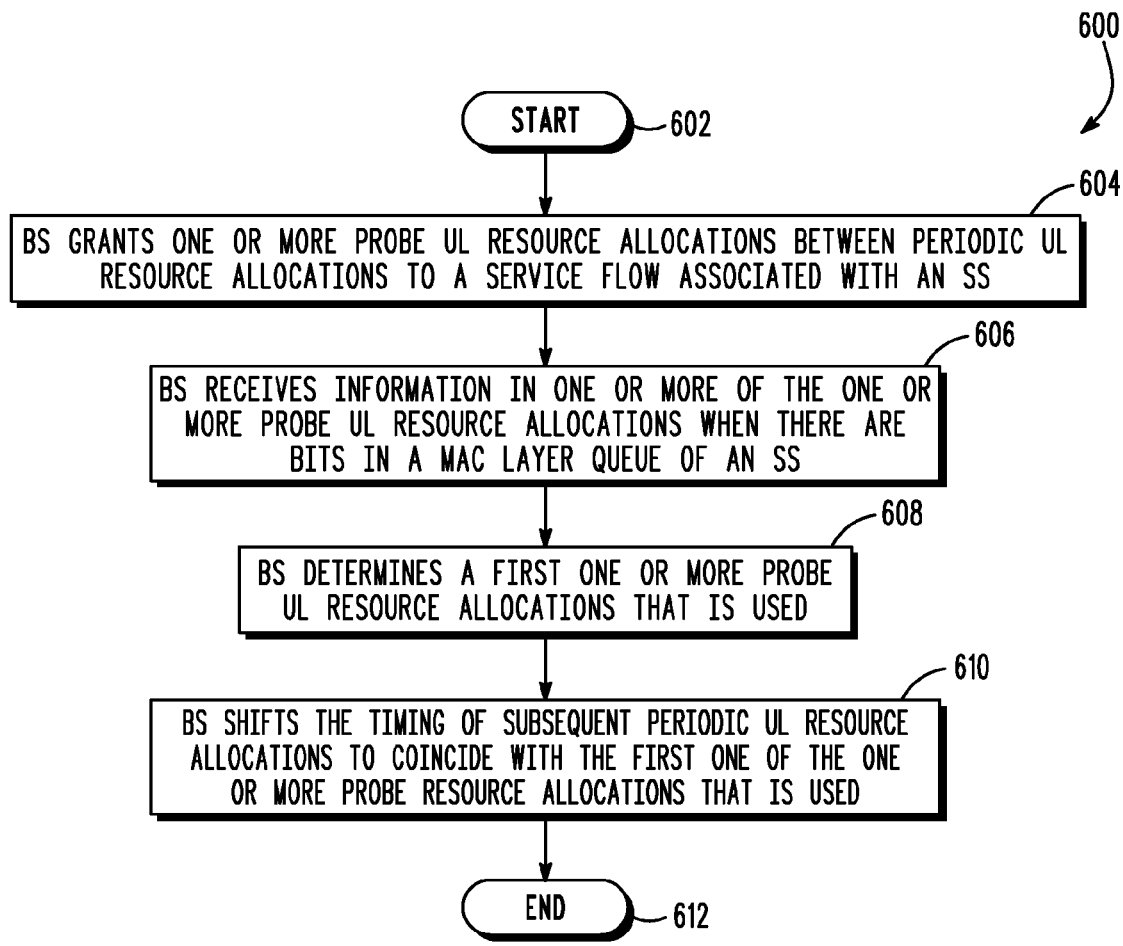
FIG. 6 is a flow chart of an exemplary process for aligning application output and uplink resource allocation of an SS of a wireless communication system according to an embodiment of the present disclosure.

Referring now to FIG. 6, an exemplary process 600 is illustrated that allows a serving base station (BS) to determine an optimal periodic UL grant time for an SS. In block 602 the process 600 is initiated, at which point control transfers to block 604. In block 604, the BS grants one or more probe UL resource allocations between periodic UL resource allocations to a service flow associated with a SS. Next, in block

606, the BS receives (for example, when there is data in a MAC layer queue of the SS) data transmitted by the SS in one or more of the probe UL resource allocations. Then, in block 608, the BS determines whether any of the probe UL resource allocations has been utilized for a desired service flow. Next, in block 610, the BS shifts the timing of subsequent periodic UL resource allocations to coincide with a first one of the probe UL resource allocations utilized by the SS for the desired service flow, if any. Following block 610, the process 600 terminates in block 612.

Figure 7:
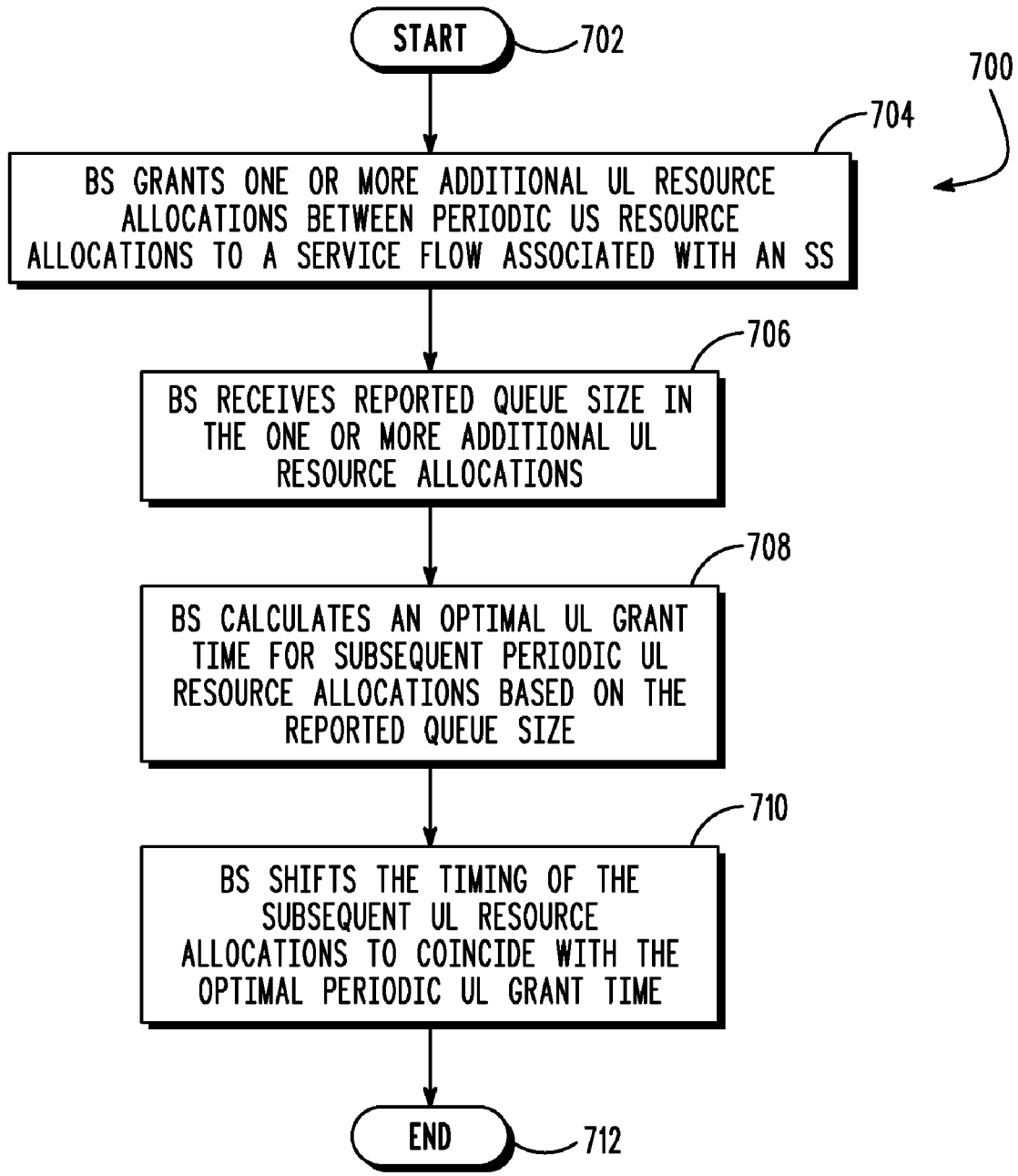
FIG. 7 is a flow chart of another exemplary process for aligning application output and uplink resource allocation of an SS of a wireless communication system according to an embodiment of the present disclosure.

With reference to FIG. 7, an exemplary process 700 is illustrated that allows a serving BS to determine an optimal periodic UL grant time for an SS based on a queue size reported by the SS. In block 702, the process 700 is initiated, at which point control transfers to block 704. In block 704, the BS grants one or more additional UL resource allocations between periodic UL resource allocations to a service flow associated with the SS. A size of the one or more additional UL resource allocations may take various values. In general, the size of the one or more additional UL resource allocations should be adequate to allow a queue size of an SS to be accurately reported. For example, the one or more additional UL resource allocations may have a size of sixteen bits each. Next, in block 706, the BS receives respective queue sizes transmitted by the SS in the one or more additional UL resource allocations. Then, in block 708, the BS determines an optimal periodic UL time for subsequent periodic UL resource allocations based upon the reported queue sizes (using, for example, the minimization equation set forth above). Next, in block 710, the BS shifts the timing of the subsequent UL resource allocations to coincide with the optimal periodic UL grant time. Following block 710, the process 700 terminates in block 712.

Figure 8:
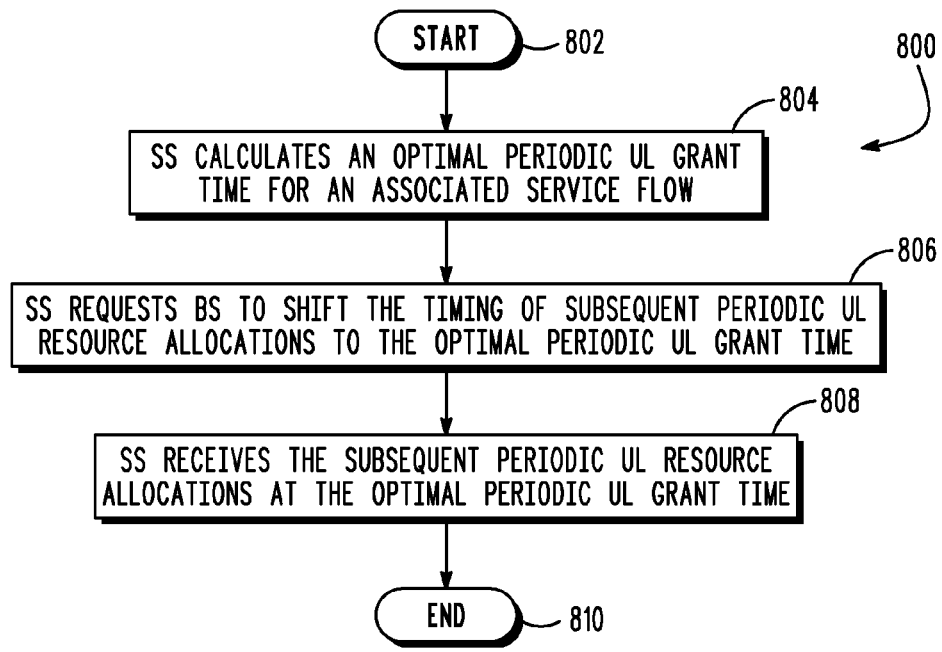
FIG. 8 is a flow chart of yet another exemplary process for aligning application output and uplink resource allocation of an SS of a wireless communication system according to an embodiment of the present disclosure.

Referring now to FIG. 8, a process 800 is illustrated in which an SS calculates an optimal periodic UL grant time for a service flow based on a queue size of a MAC layer queue. In block 802, the process 800 is initiated, at which point control transfers to block 804. In block 804, the SS calculates an optimal periodic UL grant time based on the queue size (using, for example, the minimization equation set forth above). Next, in block 806, the SS transmits a request to the BS to shift subsequent periodic UL resource allocations to the optimal periodic UL grant time. The request by the SS may correspond to a reported frame latency that is transmitted in, for example, a frame latency field of a MAC layer management message or in a periodic UL resource allocation. Then, in block 808, the SS receives subsequent periodic UL resource allocations (transmitted from the BS) that have been shifted by the BS to coincide with the optimal periodic UL grant time. Following block 808, the process 800 terminates in block 810.

Figure 9:
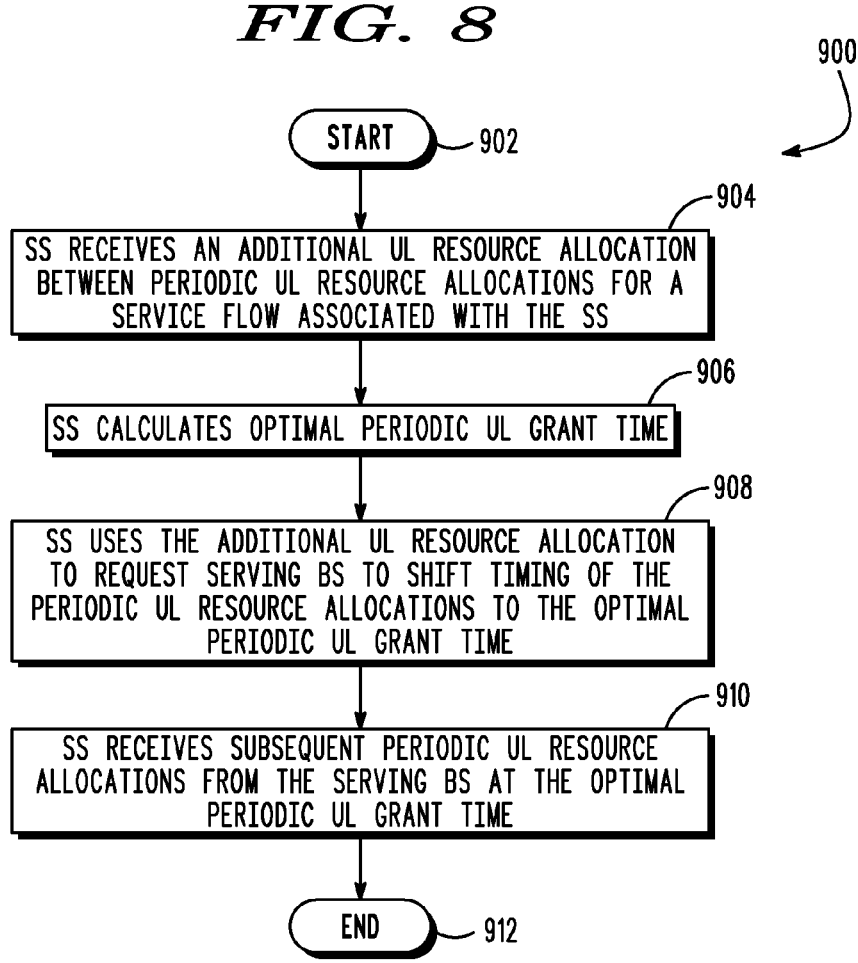
FIG. 9 is a flow chart of still another exemplary process for aligning application output and uplink resource allocation of an SS of a wireless communication system according to an embodiment of the present disclosure.

Referring now to FIG. 9, a process 900 is illustrated in which an SS calculates (using, for example, the minimization equation set forth above) an optimal periodic UL grant time for a service flow and requests a shift in subsequent periodic UL resource allocations based on the optimal periodic UL grant time. In block 902, the process 900 is initiated, at which point control transfers to block 904. In block 904, the SS receives an additional UL resource allocation between periodic UL resource allocations. Next, in block 906, the SS determines an optimal periodic UL grant time that minimizes a queue size (using, for example, the equation set forth above) of an associated MAC layer queue of the SS. Then, in block 908, the SS uses the additional UL resource allocation to request that the BS shift subsequent periodic UL resource allocations to the optimal periodic UL grant time to minimize the queue size. Next, in block 910, the SS receives subsequent periodic UL resource allocations (transmitted by the BS) that are shifted by the BS to coincide with the optimal periodic UL grant time requested by the SS. Following block 910, the process 900 terminates in block 912.

Figure 10:
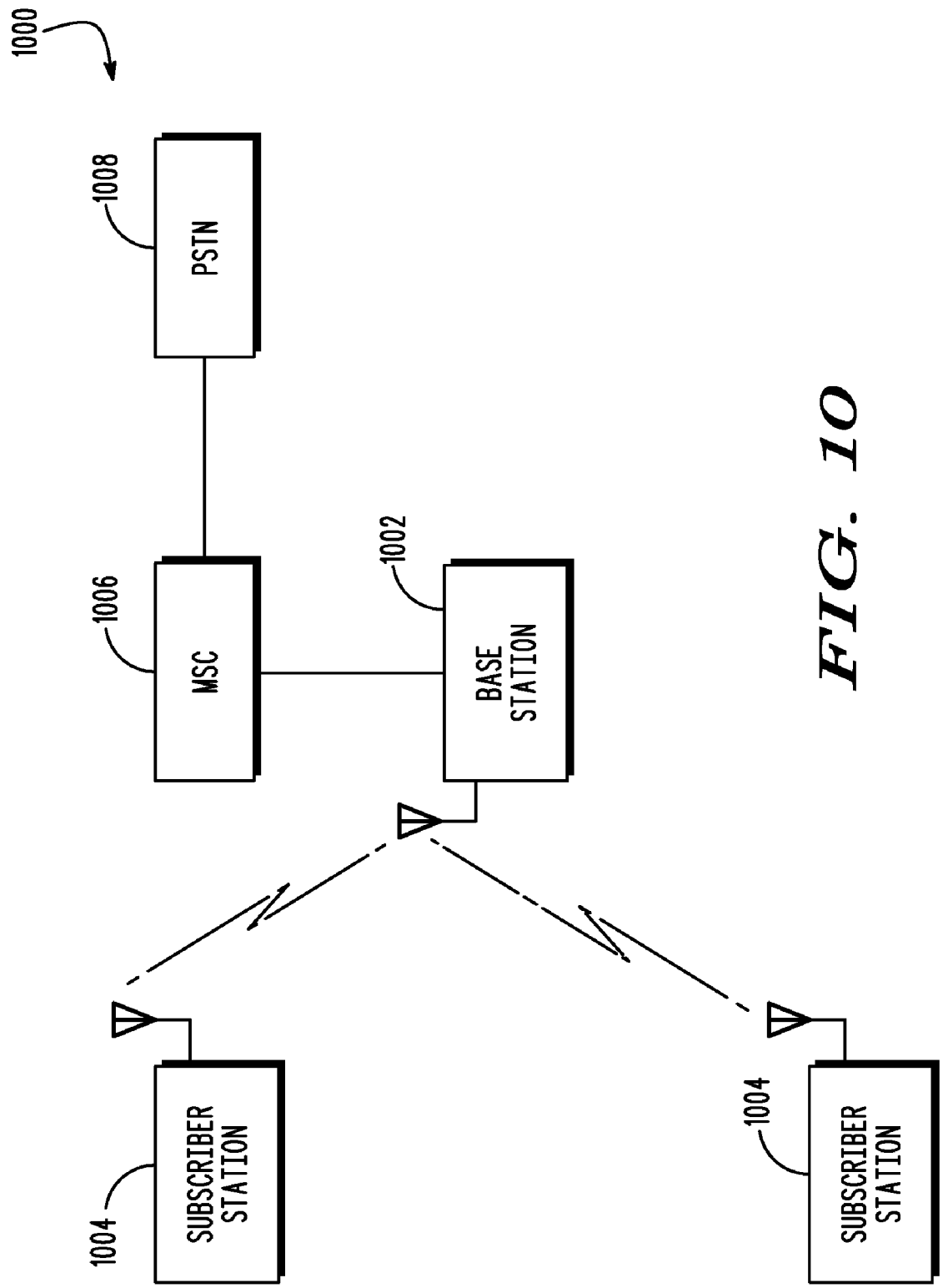
FIG. 10 is a block diagram of an exemplary wireless communication system.

With reference now to FIG. 10, an exemplary wireless communication system 1000 is depicted in which the embodiments of the present invention may operate. Communication system 1000 includes multiple subscriber stations (SSs) 1004 (two shown), e.g., mobile stations (MSs), that are configured to communicate with a remote device (not shown) via a serving base station (BS) 1002. Each SS 1004 may transmit/receive various information, e.g., voice, images, video, and audio, to/from various sources, e.g., another SS or an internet-connected server. As is depicted in FIG. 10, the BS 1002 is coupled to a mobile switching center (MSC) 1006, which MSC further is coupled to a public switched telephone network (PSTN) 1008. Alternatively, the system 1000 may not employ the MSC 1006 when voice service is based on Voice over Internet Protocol (VoIP) technology, where calls to the PSTN 1008 are typically completed through a gateway (not shown). The BS 1002 includes a transmitter and a receiver (not individually shown), both of which are coupled to a control unit (not shown), which may be, for example, a microprocessor, a microcontroller, a programmable logic device (PLD), or an application specific integrated circuit (ASIC) that is configured to execute a software system, maintained in one or more memory devices (not shown), to perform the various techniques disclosed herein. Similarly, each SS 1004 includes a transmitter and a receiver (not individually shown) coupled to a control unit (not shown), which may be, for example, a microprocessor, a microcontroller, a PLD, or an ASIC that is configured to execute a software system, maintained in one or more memory devices (not shown), to perform the various techniques disclosed herein. The control unit of the SS may also be coupled to a display (e.g., a liquid crystal display (LCD)) and an input device (e.g., a keypad). Accordingly, techniques have been disclosed herein the substantially align an application output of a subscriber station with uplink resource allocation for the subscriber station.

Preferably, communication system 1000 is an Institute of Electrical and Electronics Engineers (IEEE) 802.16 (WiMAX) communication system and SSs 1004, BS 1002, and MSC 1006 are compliant with the IEEE 802.16 standards. However, communication system 1000 may operate in accordance with any technology that employs a shared uplink (UL) channel, such as a third-generation partnership project long-term evolution (3GPP-LTE) communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment is typically stored in one or more machine readable storage mediums, such as fixed (hard) drives, diskettes, optical disks, magnetic tape, semiconductor memories (e.g., read-only memories (ROMs), programmable ROMs (PROMs), etc.), thereby making an article of manufacture in accordance with the invention. The article of manufacture containing the computer programming code is used by either executing the code directly from the storage device, by copying the code from the storage device into another storage device, such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of reducing a time delay between an application output at a subscriber station and uplink resource allocation for the subscriber station, comprising:
    scheduling, between periodic uplink resource allocations, one or more probe uplink resource allocations for the subscriber station;
    receiving, at an access point, respective information in at least one of the one or more probe uplink resource allocations and wherein the respective information corresponding to respective reported queue sizes of a queue of the subscriber station at different times; and
    adjusting a period of a subsequent periodic uplink resource allocation based on receiving information in the at least one of the one or more probe uplink resource allocations wherein adjusting the period of subsequent periodic uplink resource allocations being based on the respective queue sizes to substantially minimize an average size of the queue.

2. The method of claim 1, wherein the adjusting the period of the subsequent periodic uplink resource allocation further comprises:
    scheduling the subsequent periodic uplink resource allocation based on one of the one or more probe uplink resource allocations when the subscriber station utilizes at least one of the one or more probe uplink resource allocations.

3. The method of claim 2, wherein each of the one or more probe uplink resource allocations is assigned to a different frame.

4. The method of claim 1, further comprising:
    transmitting the one or more probe uplink resource allocations and the periodic resource allocations to the subscriber station; and
    transmitting the subsequent periodic uplink resource allocation to the subscriber station.

5. The method of claim 1, wherein the adjusting the period of the subsequent periodic uplink resource allocation further comprises:
    shifting the subsequent periodic uplink resource allocation to substantially coincide with one of the one or more probe uplink resource allocations when the subscriber station utilizes at least one of the one or more probe uplink resource allocations.

6. The method of claim 1, wherein the one or more probe uplink resource allocations and the periodic uplink resource allocations have a different size.

7. A wireless communication system, comprising:
    a subscriber station; and
    a base station in communication with the subscriber station, wherein the base station is configured to:
        schedule, between periodic uplink resource allocations, one or more probe uplink resource allocations for the subscriber station;
        receive respective information in at least one of the one or more probe uplink resource allocations and wherein the respective information corresponding to respective reported queue sizes of a queue of the subscriber station at different times; and
        adjust a period of a subsequent periodic uplink resource allocation based on receiving information in the at least one of the one or more probe uplink resource allocations wherein the period of subsequent periodic uplink resource allocations being based on the respective queue sizes to substantially minimize an average size of the queue.

8. The wireless communication system of claim 7, wherein the base station is further configured to:
    schedule the subsequent periodic uplink resource allocation based on one of the one or more probe uplink resource allocations when the subscriber station utilizes at least one of the one or more probe uplink resource allocations.

9. The wireless communication system of claim 8, wherein each of the one or more probe uplink resource allocations is assigned to a different frame.

10. The wireless communication system of claim 7, wherein the base station is further configured to:
    transmit the one or more probe uplink resource allocations and the periodic resource allocations to the subscriber station; and
    transmit the subsequent periodic uplink resource allocation to the subscriber station.

11. The wireless communication system of claim 7, wherein the base station is further configured to:
    shift the subsequent periodic uplink resource allocation to substantially coincide with one of the one or more probe uplink resource allocations when the subscriber station utilizes at least one of the one or more probe uplink resource allocations.

12. The wireless communication system of claim 7, wherein the subscriber station is an IEEE 802.16 standard compliant subscriber station that communicates in real-time.

13. The wireless communication system of claim 7, wherein the one or more probe uplink resource allocations and the periodic uplink resource allocations are equally sized.

14. A base station comprising:
    a control unit that is configured to:
        schedule, between periodic uplink resource allocations, one or more probe uplink resource allocations for a subscriber station;
        receive respective information in at least one of the one or more probe uplink resource allocations and wherein the respective information corresponding to respective reported queue sizes of a queue of the subscriber station at different times; and
        adjust a period of a subsequent periodic uplink resource allocation based on receiving information in the at least one of the one or more probe uplink resource allocations wherein the period of subsequent periodic uplink resource allocations being based on the respective queue sizes to substantially minimize an average size of the queue.

15. The base station of claim 14, wherein the control unit is further configured to:
schedule the subsequent periodic uplink resource allocation based on one of the one or more probe uplink resource allocations when the subscriber station utilizes at least one of the one or more probe uplink resource allocations.

16. The base station of claim 14, wherein the control unit is further configured to:
transmit the one or more probe uplink resource allocations and the periodic resource allocations to the subscriber station; and
transmit the subsequent periodic uplink resource allocation to the subscriber station.

17. The base station of claim 14, wherein the control unit is further configured to:
shift the subsequent periodic uplink resource allocation to substantially coincide with one of the one or more probe uplink resource allocations when the subscriber station utilizes at least one of the one or more probe uplink resource allocations.

* * * * *